US012267687B2

(12) United States Patent
Xia et al.

(10) Patent No.: US 12,267,687 B2
(45) Date of Patent: Apr. 1, 2025

(54) METHOD OF OPTIMIZING THE UTILIZATION OF THE WHITE SPACE BASED ON THE ENHANCEMENT OF THE ADJACENT FREQUENCIES

(71) Applicant: ANYWAVE COMMUNICATION TECHNOLOGIES CO., LTD., Changshu (CN)

(72) Inventors: Jingsong Xia, Hawthorn Woods, IL (US); Wenhua Li, Lincolnshire, IL (US); Bowei Song, Changshu (CN); Yingying Fan, Changshu (CN)

(73) Assignee: ANYWAVE COMMUNICATION TECHNOLOGIES CO., LTD., Changshu (CN)

( * ) Notice: Subject to any disclaimer, the term of this patent is extended or adjusted under 35 U.S.C. 154(b) by 750 days.

(21) Appl. No.: 17/906,074

(22) PCT Filed: Jun. 14, 2019

(86) PCT No.: PCT/CN2019/091177
§ 371 (c)(1),
(2) Date: Sep. 11, 2022

(87) PCT Pub. No.: WO2020/228090
PCT Pub. Date: Nov. 19, 2020

(65) Prior Publication Data
US 2023/0354042 A1 Nov. 2, 2023

(30) Foreign Application Priority Data

May 10, 2019 (CN) .......................... 201910389929.0

(51) Int. Cl.
*H04W 16/10* (2009.01)
*H04W 16/14* (2009.01)
(Continued)

(52) U.S. Cl.
CPC .......... *H04W 16/10* (2013.01); *H04W 16/14* (2013.01); *H04W 16/18* (2013.01);
(Continued)

(58) Field of Classification Search
None
See application file for complete search history.

(56) References Cited

U.S. PATENT DOCUMENTS

2010/0255794 A1\* 10/2010 Agnew ................. H04W 16/14
455/77
2012/0294163 A1\* 11/2012 Turtinen ........... H04W 56/0045
370/252
2016/0100321 A1\* 4/2016 Arai .................... H04W 52/243
455/67.14

FOREIGN PATENT DOCUMENTS

WO WO-2010043270 A1 \* 4/2010 ............ H04W 16/14

\* cited by examiner

*Primary Examiner* — Walter J Divito
(74) *Attorney, Agent, or Firm* — CBM PATENT CONSULTING, LLC

(57) ABSTRACT

A method of optimizing the utilization of white space based on the enhancement of the adjacent frequency, comprising: obtaining an available white space channel; and separately and correspondingly compensating an upper adjacent frequency and/or a lower adjacent frequency of the channel according to a relationship between the coverage of authorized signals of adjacent frequencies of the channel and the coverage of a white space device, the white space device obtain the maximum number of selectable channels and the maximum transmission power without affecting the authorized signals currently used in the adjacent frequencies; enhancing emission intensities of TV broadcast signals or other authorized signals of respective adjacent frequencies of a white space channel, a white space device operating over the white space channel meet the predetermined (Continued)

requirements of transmission power and coverage without adversely affecting the coverage and reception of authorized signals currently used in the adjacent frequencies.

9 Claims, 7 Drawing Sheets

(51) Int. Cl.
*H04W 16/18* (2009.01)
*H04W 72/0453* (2023.01)
*H04W 72/54* (2023.01)
*H04W 72/541* (2023.01)

(52) U.S. Cl.
CPC ....... *H04W 72/0453* (2013.01); *H04W 72/54* (2023.01); *H04W 72/541* (2023.01)

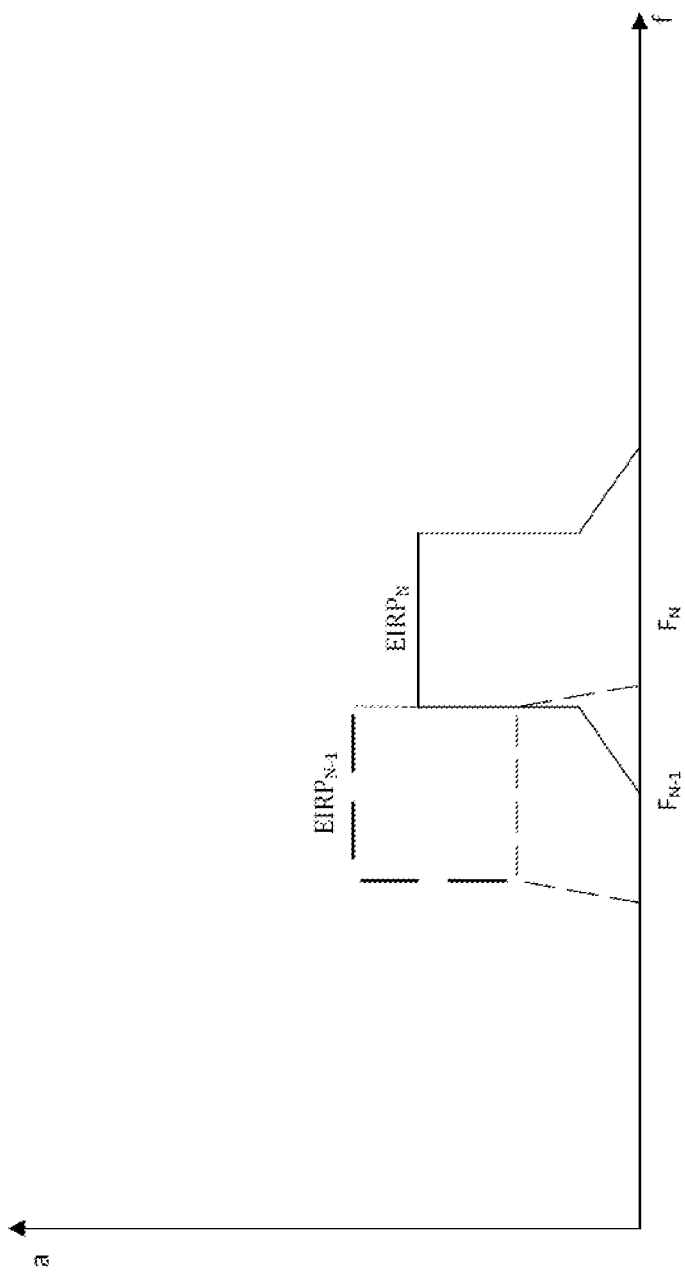

METHOD OF OPTIMIZING THE UTILIZATION OF THE WHITE SPACE BASED ON THE ENHANCEMENT OF THE ADJACENT FREQUENCIES

TECHNICAL FIELD

The present invention relates to a technology in the field of wireless communication, in particular to a method for optimal utilization of the white space based on the enhancement of the adjacent frequencies.

BACKGROUND ART

TV white space (TV white space, TVWS for short) refers to the wireless spectrum that has been allocated to broadcast and television but has not been occupied by a certain TV broadcast or other authorized users within a specific time and space. They include originally reserved protection channels to prevent interference between TV signals, channels released after conversion from analog TV to digital TV, etc., and are widely distributed in the VHF/UHF frequency band. How to dynamically utilize these idle frequency bands and improve the resource utilization of the white space has become the focus of academia and industry.

In the use of white space, there are two problems in the current research direction of most technologies: the existing technology often searches for available white space frequency and confirms whether the channel is available through real-time monitoring of known databases and cognitive radio technology. When the adjacent frequency of the spectrum interferes with its adjacent channel beyond the predetermined threshold, the frequency cannot be used, so the setting of the threshold will have an essential impact on the utilization of the white space; When performing spectrum allocation and transmission power control, it is necessary to reduce the transmission power of the white space according to the actual situation to avoid the deterioration of the coverage and reception of the existing authorized users of adjacent frequencies, but this will lead to a significant reduction in the coverage of the white space. The established coverage needs cannot be met.

SUMMARY OF THE INVENTION

Aiming at the defects that the existing white space technology cannot meet the established requirements in terms of frequency selection, coverage, and output power, the present invention proposes a white space optimization and utilization method based on the enhancement of adjacent frequencies. To enhance the transmission of the TV broadcast or other authorized signals, so that the white space device operating at the white space frequency can meet the predetermined transmission power and coverage requirements without deteriorating the coverage and reception of the adjacent frequency authorized signals.

The present invention is achieved through the following technical solutions:

The present invention relates to a method of optimizing the utilization of the white space based on the enhancement of the adjacent frequencies. Corresponding compensation is performed on the upper and/or lower adjacent frequencies so that the white space devices can reach the most selectable frequencies and the maximum transmit power without affecting the existing adjacent frequency authorized signals.

Upper and/or lower adjacent frequencies include any N+m/N−m channels corresponding to white space frequency $F_N$. N is the channel number corresponding to the white space frequency, and m is an integer greater than or equal to 1; preferably it refers to the N+1 and N−1 channels that with a greater influence of the white space frequency $F_N$. For the receiving device, it also refers to the N+1/N−1 channels.

The present invention specifically includes:

The first step is the design and planning stage of white space device: according to the application requirements, plan the intended coverage, transmitting information, and Effective Isotropic Radiated Power (EIRP for short) of the white space device;

The white space device includes but is not limited to: LTE base station or its user equipment, 802.11a/f, 802.22 Super Wi-Fi based base station, and its user equipment, etc.

The transmitting information includes: specific geographic location, erection height, antenna gain, and field type of the transmitting device.

EIRP=P−Loss+G, in which P is the output power of the white space device (unit: dBm). Loss is the transmission line loss between the output of the white space device and the antenna feed (unit: dB), G is the gain (unit: dB) of the antenna of the white space device.

The second step is to query the local spectrum utilization database according to the transmitting point information of the white space device to obtain a list of available white space frequencies.

2.1) When there is a corresponding EIRP threshold for the available white space frequencies in the list, select any available white space frequency corresponding to the EIRP threshold greater than the intended transmit power, or all the frequencies have a threshold lower than the intended transmit power, then choose the closest among them to be the channel. If the available white space frequency in the list has no EIRP threshold pre-defined, then choose any white space frequency and use the intended transmit power as the EIRP threshold. Let's use the number N to correspond to the channel number of the frequency of the white space.

The said above greater than the intended transmits power means: that there is at least one EIRP threshold higher than the intended transmit power, for example: when the intended transmit power is 15 w, then there are three frequency channels whose EIRP thresholds are respective 16 w, 18 w and 20 w, which are all higher than 15 w. So, any of the three channels can be selected as the white space channel.

The said above less than but closest means: all EIRP thresholds arc lower than the intended transmit power, for example: when the intended transmit power is 25 w, then the three frequency channels whose respective EIRP thresholds are 16 w, 18 w, and 20 w, then select the channel with the 20 w threshold which is the closest to 25 w in the list to be the white space channel.

2.2) Before deciding to transmit signals at $F_N$, first measure the noise floor ($Noise_N$) within the entire channel bandwidth of channel number N (unit: dBm). If the difference between the $Noise_N$ and $EIRP_N$ is greater than or equal to the white space device reception threshold $TH_N$ plus a receiving margin $M_N$, then determine the current white space $F_N$ is usable, otherwise repeat steps 2.1 and 2.2 and reselect another available white space frequency.

The receiving margin is usually determined based on engineering experience. Wherein the urban environment, obstacles within the visible distance, and the intended coverage will affect the setting value of the receiving margin. The denser the city, the more obstacles, and the larger the intended coverage, the larger the reception margin that needs to be reserved.

2.3) Use the white space device at frequency $F_N$, at the predetermined emission point to the intended coverage area with the corresponding $EIRP_N$ for a test launch.

The third step is to detect whether there is an authorized signal in the adjacent frequencies $F_{N+m}$ and $F_{N-m}$ of the white space frequency $F_N$ at the emission point of the white space device and compare the authorized coverage of the authorized signals on the adjacent frequencies with that of the white space device.

3.1) When there is no overlap between the trial transmission coverage of the white space device and the authorized coverage of the adjacent frequency signal, it is not necessary to enhance any of the adjacent frequency authorized signal;

3.2) When there is an overlap between the trial transmission coverage of the white space device and the authorized coverage of the upper adjacent frequency and/or the lower adjacent frequency authorized signal, the adjacent frequency compensation device shall be used to reasonably perform the upper and/or lower adjacent frequency authorized signals enhancement, that is, the $EIRP_{N+m}$ of the upper and/or the $EIRP_{N-m}$ of the lower adjacent frequencies after enhancement should satisfy: the larger of Condition A and Condition B as the $EIRP_{N+m}$ and $EIRP_{N-m}$'s lower limit; and the smaller of the condition C and Condition D as the $EIRP_{N+m}$ and $EIRP_{N-m}$'s upper limit;

A) $EIRP_{N+m}$ and $EIRP_{N-m}$'s lower limits should satisfy: $EIRP_{N+m} - EIRP_N \geq R_{D/U-N+m}$ and $EIRP_{N-m} - EIRP_N \geq R_{D/U-N-m}$, that is $EIRP_{N+m} \geq EIRP_N + R_{D/U-N+m}$, $EIRP_{N-m} \geq EIRP_N + R_{D/U-N-m}$, where $EIRP_N$ is the Effective Isotropic Radiated Power of the white space device at channel $F_N$ (unit: dBm), $R_{D/U-N+m}$ and $R_{D/U-N-m}$ is the threshold of the desired-to-undesired signal ratio that the receiver can resist against noise as defined in the corresponding standard for adjacent-frequency authorized signals (unit: dB). The threshold defines the maximum dB allowed for the desired signal to be less than the undesired signal.

B) $EIRP_{N+m}$ and $EIRP_{N-m}$'s lower limits should also satisfy: $EIRP_{N+m} - P_{aj-N+m} \geq TH_{N+m}$, and $EIRP_{N-m} - P_{aj-N-m} \geq TH_{N-m}$, that is $EIRP_{N+m} \geq P_{aj-N+m} + TH_{N+m}$ and $EIRP_{N-m} \geq P_{aj-N-m} + TH_{N-m}$, where: $P_{aj-N+m}$ and $P_{aj-N-m}$ are the power (unit: dBm) leaked to its upper and lower adjacent frequencies by the white space device, which satisfies $P_{aj-N+m} = EIRP_N - L_{N+m}$; $P_{aj-N-m} = EIRP_N - L_{N-m}$, $EIRP_N$ is Effective Isotropic Radiated Power of the white space device at channel $F_N$ (unit: dBm), $L_{N+m}$ and $L_{N-m}$ is the reduction value (unit: dB) of the leakage power of the upper and lower adjacent frequencies of the white space device compared to its transmit power at the white space frequency (unit: dB); $TH_{N+m}$, $TH_{N-m}$ is the received signal-to-noise ratio thresholds (unit: dB) of the upper and lower adjacent frequency authorized signals, respectively.

C) $EIRP_{N+m}$ and $EIRP_{N-m}$'s upper limit should satisfy: $EIRP_N - EIRP_{N+m} \geq R_{D/U-N}$, and $EIRP_N - EIRP_{N-m} \geq R_{D/U-N}$, that is $EIRP_{N+m} \leq EIRP_N - R_{D/U-N}$, $EIRP_{N-m} \leq EIRP_N - R_{D/U-N}$, where $EIRP_N$ is Effective isotropic Radiated Power of the white space device at channel $F_N$ (unit: dBm), $R_{D/U-N}$ is the lower limit of the desired-to-undesired signal ratio that the receiver can resist against noise as defined in the corresponding standard of the white space device. The threshold defines the maximum dB allowed for the desired signal to be less than the undesired signal.

D) $EIRP_{N+m}$ and $EIRP_{N-m}$'s upper limit should also satisfy: $EIRP_{N+m} \leq EIRP_N + L_{N+m-1} - TH_N$; $EIRP_{N-m} \leq EIRP_N + L_{N-m+1} - TH_N$; where: $L_{N+m-1}$ and $L_{N-m+1}$ is the power ratio of the main signal of the adjacent frequency to their adjacent upper/lower adjacent channels, that is, the interference power difference of the white space frequency (unit: dB); $EIRP_N$ is Effective Isotropic Radiated Power of the white space device at channel $F_N$ (unit: dBm), $TH_N$ is the receiving signal-to-noise ratio threshold of the white space device. Since the power level of the authorized signal of the upper and/or lower adjacent frequency is increased, the adjacent channel interferences generated to the $F_N$ of the white space are respectively $P_{aj-N1} = EIRP_{N+m} - L_{N+m-1}$ and $P_{aj-N2} = EIRP_{N-m} - L_{N-m+1}$. These adjacent channel interference $P_{aj-N1}$ and $P_{aj-N2}$ have increased the noise floor of the white space $F_N$. Under the same emission intensity of the white space device, it reduces the received signal-to-noise ratio of the white space device. Therefore, say the threshold of the receiving signal-to-noise ratio of the white space device is $TH_N$, then when: $EIRP_N - P_{aj-N1} \leq TH_N$ or $EIRP_N - P_{aj-N2} \leq TH_N$, then the white space device will not work properly, so the upper and lower adjacent frequencies EIRP upper limit need to meet the $EIRP_{N+m} \leq EIRP_N + L_{N+m-1} - TH_N$; $EIRP_{N-m} \leq EIRP_N + L_{N-m+1} - TH_N$.

The enhancement is to increase the authorized signal strength of the upper and/or lower adjacent frequencies through the adjacent frequency compensation device to compensate for the adjacent frequency interference caused by the additional white space device, restore or even increase the reception margin of the transmitted signal of the upper and lower adjacent frequencies in the area.

Preferably, detect the intensity of the adjacent frequency authorized signal in the overlapping area of the intended coverage area of the white space device and the adjacent frequency authorized signal coverage area.

When the adjacent frequency authorized signal is affected by the activation of the white space device, check the setting and installation of the upper and/or lower adjacent frequency compensation device and further increase the EIRP of the adjacent frequency compensation device.

Preferably, within the intended coverage area of the white space device, test the reception of the white space device to verify whether the coverage requirements are met: when the intended EIRP has been transmitted, but the intended coverage is still not met, check the white space device's installation and setup, and further reduce the EIRP of the adjacent frequency compensation device and re-detect the overlapping area.

The enhancements described are adopted but not limited to: local manual settings or remote settings, real-time updates on demand or preset fixed values, independent control of each emission point or included in the unified planning of the white space device, and linked with the transmit power of the white space device, and coordinated by the central control system.

The adjacent frequency power compensation device adopts but is not limited to:

1) Set up an on channel repeater for the upper and/or lower adjacent frequencies respectively, specifically: the receiving and transmitting antennas of the on channel repeaters are respectively in $F_{N+m}$ and/or $F_{N-m}$ frequency, and each device is used to receive $F_{N+m}$ and/or $F_{N-m}$ from a nearby authorized signal transmission tower, and then to reasonably amplify the signal, and then send out through the transmitting antenna of the same frequency as the receiving antenna, so as to achieve the supplementary coverage of adjacent frequency in the area via on channel repeaters;

2) Set up optical fiber repeaters for the upper and/or lower adjacent frequencies respectively, specifically: respectively from the nearby $F_{N+m}$ and/or $F_{N-m}$ authorized signal transmitting tower, directly transmitting the radio frequency signal through the optical fiber to the transmitting point of the white space device, and reasonably amplifies the signal respectively, and then send out the signal via $F_{N+m}$ and/or $F_{N-m}$ transmitting antennas, so as to achieve the supplementary coverage of adjacent frequency in the area via optical fiber repeater;

3) Set up transmitters transmitting on the same frequency for the upper and/or lower adjacent frequencies respectively, specifically: receiving radio frequency or TS signals respectively, and set up the transmitting frequency as the same frequency as the original adjacent frequency authorized signal ($F_{N+m}$ and/or $F_{N-m}$), to realize the supplementary coverage of adjacent frequency via constructing single frequency network.

Technical Effect

Compared with the prior art, the present invention compensates for the adjacent frequency interference caused by the additional white space device by adding power compensation device to the adjacent frequency of the white space frequency at the installation location so that it can restore, and even increase the reception margin of the original upper and lower adjacent frequency transmission signals in the area. Therefore, the coverage and reception of the upper and lower adjacent frequency authorized signals will not be affected by the use of the white space, and the white space device does not need to back off the transmit power. The method of the invention also defines the upper and lower limits for reasonable enhancement of the adjacent frequency compensation device, which not only ensures that the white space device does not deteriorate the adjacent frequency coverage and reception, but also ensures that the white frequency spectrum device can still use the same white space frequency and the proposed coverage is met after the adjacent frequency compensation device is installed. The invention expands the addressable range of the white space device, increases the number of selectable frequencies in the white space, and reduces the limitation of the transmission power of the white space device by the upper and lower adjacent frequency authorized signals, thereby greatly improving the utilization and availability of the white space.

BRIEF DESCRIPTION OF DRAWINGS

FIG. 7 is a schematic diagram of the spectrum of the white space device and its lower adjacent frequency authorized signal both before and after the enhancement in Embodiment 3.

DETAILED DESCRIPTION OF THE INVENTION

Embodiment 1

Figure 1:
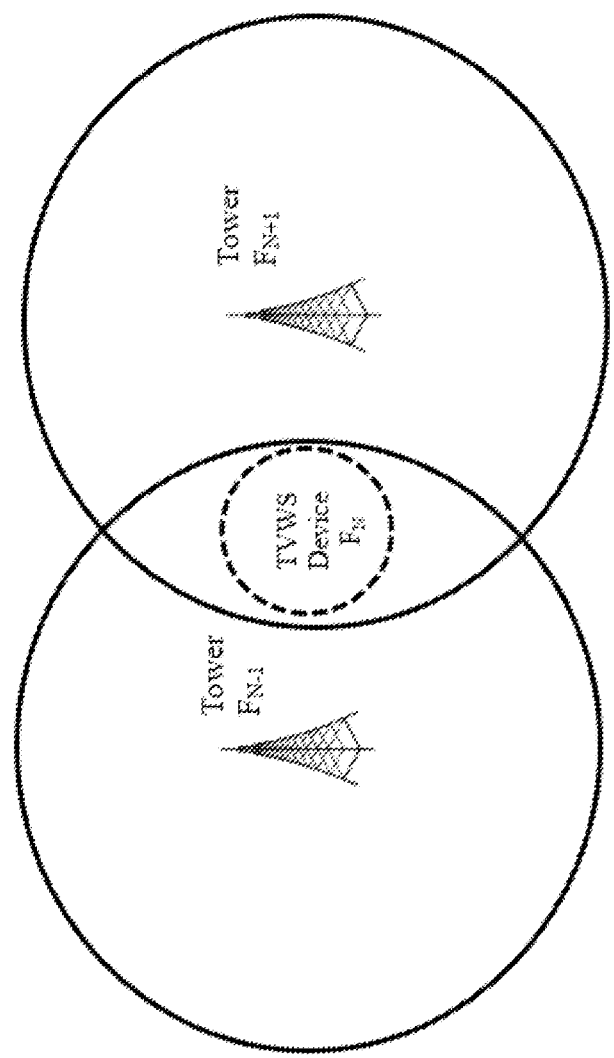
FIG. 1 is the schematic diagram that the intended coverage area of the white space device and its adjacent frequency authorized coverage area overlap in Embodiment 1.

The present embodiment relates to a method of optimizing the utilization of the white space based on the enhancement of the adjacent frequency signal. The application environment is as shown in FIG. 1. The white space device is to be installed in the overlapping area authorized by two broadcasting television towers.

This embodiment specifically includes the following steps:

Step 1. According to the application, it is necessary to realize the signal coverage of the white space device within the range of the dotted circle area shown in FIG. 1. In this embodiment, the white space device is an LTE base station, and the radius of the dotted circle area is 1000 meters, the transmitting point of the LTE base station is at the center of the circle, the proposed EIRP is 20 w (that is 43 dBm), and the antenna height to be erected is 25 meters.

Step 2. According to the above LTE base station installation information, use the known spectrum utilization database, and find the white space frequency that can be used locally, for example, CH15, and the maximum EIRP according to the license is 25 w, which can meet the requirements of the LTE base station. First, at the installation point of the LTE base station, measure the noise floor of CH15, which is −85 dBm. It is known that the intended transmit power of the LTE base station is 43 dBm, the engineering design receiving margin is 30 dB, and the receiving threshold is 1.5 dB, then 43−(−85)=128>1.5+30, then confirm that the white space frequency CH15 is usable, thus at the LTE base station erection point, a trial transmission can be carried out with an omnidirectional power of 43 dBm for the intended coverage area.

Figure 2:
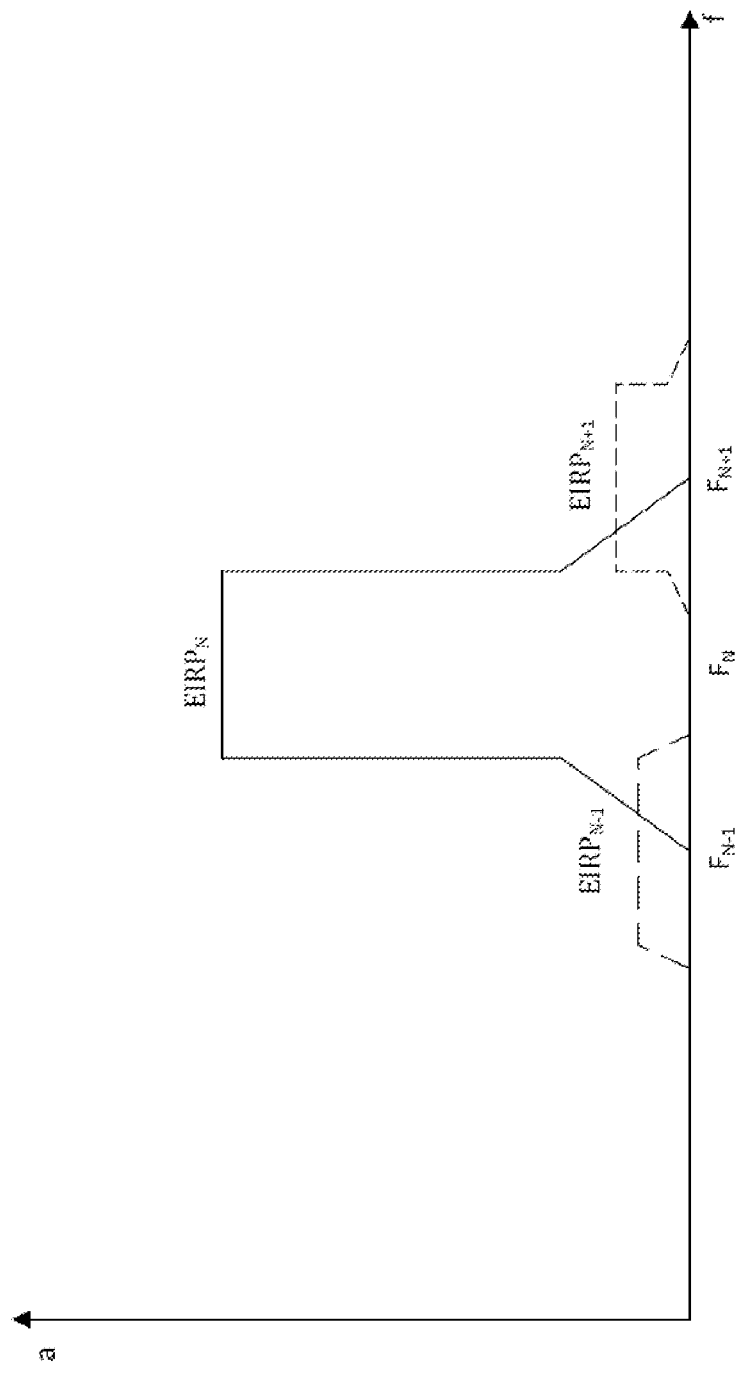
FIG. 2 is a schematic diagram of the spectrum of the white space device and its adjacent frequency authorized signal before the enhancement in embodiment 1.

Step 3. From FIG. 1, it can be seen that the intended coverage of the LTE base station is a subset of the authorized coverage of the existing adjacent frequency CH14 and CH16 digital TV broadcast signals. From FIG. 2, it is known that the local signal strength of CH14 and CH16 compared to the white space device is much lower, so it is necessary to reasonably enhance the upper and lower adjacent frequency signal respectively. The upper and lower thresholds for reasonable enhancement are determined in the following sub-steps:

1) According to the formula $EIRP_{N+m} \geq EIRP_N + R_{D/U-N+m}$, $EIRP_{N-m} \geq EIRP_N + R_{D/U-N-m}$, where in this embodiment, $R_{D/U-N+m}$ and $R_{D/U-N-m}$ is −33 dB, $EIRP_N$=43 dBm, so $EIRP_{N+m}$ and $EIRP_{N-m}$'s lower limit is at least 43 dBm−33 dB=10 dBm.

2) According to the formula $EIRP_{N+m} \geq P_{aj-N+m} + TH_{N+m}$ and $EIRP_{N-m} \geq P_{aj-N-m} + TH_{N-m}$, where $P_{aj-N+m} = EIRP_N - L_{N+m}$, $P_{aj-N-m} = EIRP_N - L_{N-m}$. In this example $EIRP_N$=43 dBm. $L_{N+m} = L_{N-m}$=45 dB, $TH_{N+m} = TH_{N-m}$=16 dB, then $P_{aj-N+m}$=−2 dBm; $P_{aj-N-m}$=−2 dBm. Hence the $EIRP_{N+m} \geq$−2 dBm+16 dB=14 dBm; $EIRP_{N-m} \geq$−2 dBm+16 dB=14 dBm, so $EIRP_{N+m}$ and $EIRP_{N-m}$'s lower limit is at least 14 dBm.

3) According to the above steps 1) and 2), confirm that the EIRP of the CH14 and CH16 compensation device should not be lower than 14 dBm.

4) According to the formula $EIRP_{N+m} \leq EIRP_N - R_{D/U-N}$. $EIRP_{N-m} \leq EIRP_N - R_{D/U-N}$, where in this embodiment, $R_{D/U-N}$ is $-30$ dB, $EIRP_N = 43$ dBm, so $EIRP_{N+m}$ and $EIRP_{N-m}$'s upper limit is at most 43 dBm+30 dB=73 dBm.

5) According to the formula $EIRP_{N+m} \leq EIRP_N + L_{N+m-1} - TH_N$; $EIRP_{N-m} \leq EIRP_N + L_{N-m+1} - TH_N$, wherein in this embodiment, $EIRP_N = 43$ dBm, $L_{N+m-1} = L_{N-m+1} = 45$ dB, $TH_N = 1.5$ dB, from which the $EIRP_{N+m}$ and $EIRP_{N-m}$'s upper limit should be at most 43 dBm+45 dB-1.5 dB=86.5 dBm.

6) According to the above steps 4) and 5), confirm that the EIRP of CH14 and CH16 compensation device cannot exceed 73 dBm at most.

7) According to the above steps 1) to 6), the range reference of the transmit power can be obtained. In practical applications, it should be flexibly adjusted according to the needs, and a sufficient margin should be ensured. Finally, in this embodiment, the equivalent EIRP of the CH14 and CH16 compensation device is selected to be 43 dBm, which is consistent with the intended transmit power of the white space device.

8) In this embodiment, the power compensation device of CH14 and CH16 is added at the location site of the LTE base station in the form of an on channel repeater. Specifically, the receiving antennas are set at the CH14 and CH16 channels respectively to receive the RF signals from the main towers of the CH14 and CH16 channels and then enhance the same-frequency signal through the repeater, and then pass the same frequency (CH14 and CH16). The enhanced EIRP is 43 dBm to achieve power compensation for the TV signal coverage of CH14 and CH16 in this area.

Step 4. In the overlapping area of the intended coverage area of the white space device and the coverage area of the adjacent frequency authorized signal, test the reception of the adjacent frequency authorized signal, and confirm the entire overlapping area. The coverage and reception of CH14 and CH16 have not changed before and after the LTE base station is installed and transmitted. In this embodiment, CH14 and CH16 can be received normally before the LTE base station is added; after the LTE base station is added, the adjacent frequency influence on CH14 and CH16 is 43 dBm-45 dB=-2 dBm, at this time. CH14 and CH16 are equipped with compensation device (on channel repeater), the output power is 43 dBm, so the signal-to-noise ratio of CH14 and CH16 is approximately equal to 43 dBm-(-2 dBm)=45 dB, exceeding their receive threshold (16 dB). Therefore, it is determined that the on channel repeater set at the adjacent frequency and increase of the transmit power is sufficient to compensate for the deteriorating influence of the LTE base station on the adjacent frequency.

Step 5. In the intended coverage area of the white space device, test the reception of the white space device to confirm whether the coverage requirements are met. In this embodiment, the influence of CH14 and CH16 on their adjacent frequency of LTE in CH15 is: 43 dBm-45 dB=-2 dBm, compared to the LTE base station's transmit power of 43 dBm, the signal SNR of the LTE base station is approximately equal to 43 dBm-(-2 dBm)=45 dB, exceeding the LTE reception threshold (1.5 dB). Therefore, it is determined that on channel repeater set at the adjacent frequency and increase of the transmit power will not affect the coverage and reception effect of the LTE base station.

Figure 3:
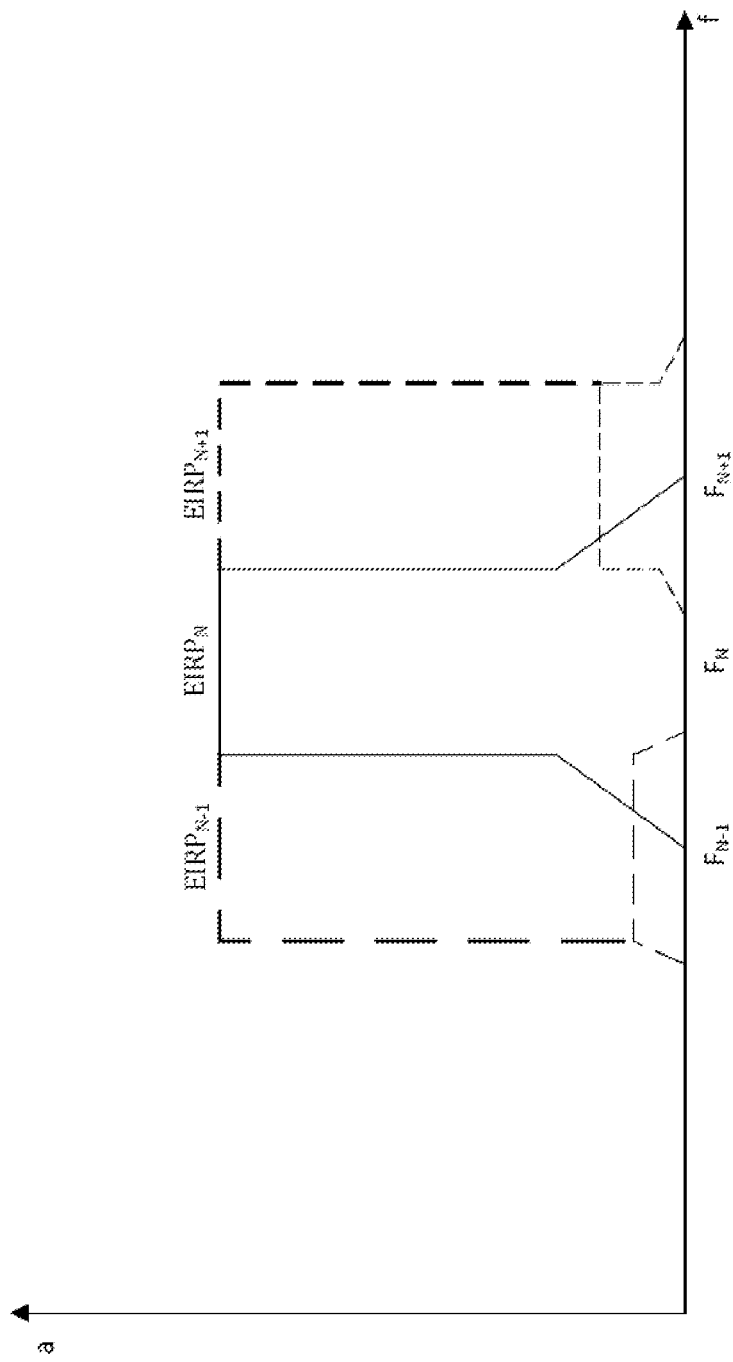
FIG. 3 is a schematic diagram of the spectrum of the white space utilization device and its adjacent frequency authorized signal after the enhancement in Embodiment 1.

In FIG. 3, the LTE base station and the adjacent frequency on channel repeater are built in the same location (LTE base station construction site) and transmit the same EIRP, so even if the transmit power is attenuated due to obstacles or distance, they are also nearly synchronous attenuation (near-far effect), which guarantees to the greatest extent that the signals of the three frequency channels can work together within the intended coverage of the LTE base station.

Embodiment 2

Figure 4:
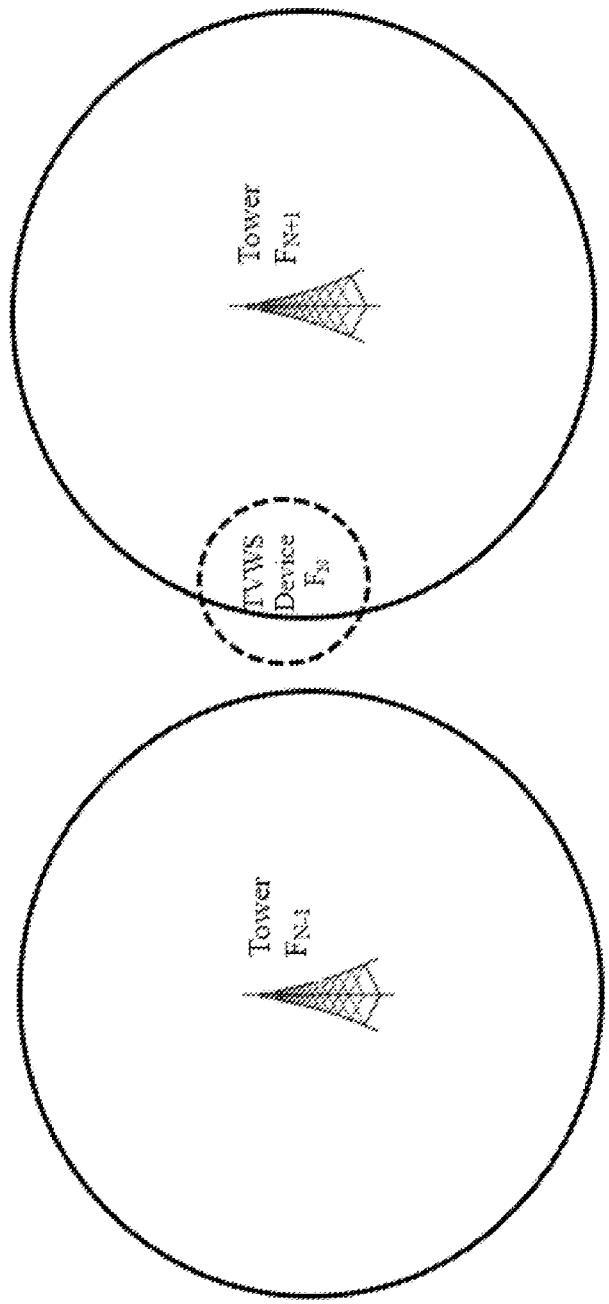
FIG. 4 is the schematic diagram that the intended coverage of the white space device in Embodiment 2 that it only overlaps with its upper adjacent frequency authorized signal.

The application environment of the white space optimization method based on the enhancement of the adjacent frequency involved in this embodiment is shown in FIG. 4.

This embodiment specifically includes the following steps:

Step 1. According to the application, it is necessary to realize the signal coverage of the white space device within the range of the dotted circle area shown in FIG. 4. In this embodiment, the white space device is an 802.11 super Wi-Fi base station, the radius of the dotted circle area is 2000 meters, the super Wi-Fi base station is installed at the center of the circle, and the proposed EIRP is 8 w (that is 39 dBm), the height of the antenna to be used is 10 meters.

Step 2. According to the above super Wi-Fi base station installation information, record in the known spectrum utilization database, find the white space frequency that can be used locally, for example, find CH23, and the maximum power corresponding to this frequency is not specified locally, then it is planned to transmit. The power can remain unchanged at 39 dBm. At the construction site of the super Wi-Fi base station, measure the noise floor superimposed on CH23 due to the existence of adjacent frequency signals, and record the noise floor as -95 dBm. It is known that the intended transmit power of the super Wi-Fi base station is 39 dBm, the engineering design receiving margin is 40 dB, and the receiving threshold is -5 dB, then 39 dBm-(-95 dBm)= 134 dB>-5 dB+40 dB, then confirm the white space frequency CH23 is available, so a super Wi-Fi base station is set up there, and the test transmission is carried out at 39 dBm within the intended coverage.

Step 3. From FIG. 4, it can be seen that the intended coverage of the super Wi-Fi base station has overlaps with the authorized coverage of its upper adjacent frequency CH24 TV broadcast signal (shown in FIG. 4), but has no overlap with the authorized coverage of the lower adjacent frequency CH22, then in this embodiment, only the upper adjacent frequency CH24 needs to be reasonably strengthened, and the upper and lower thresholds of the reasonable enhancement are determined by the following sub-steps:

1) According to the formula $EIRP_{N+m} \geq EIRP_N + R_{D/U-N+m}$, where in this embodiment, $R_{D/U-N+m}$ is $-30$ dB. $EIRP_N = 39$ dBm, so $EIRP_{N+m}$'s lower limit of is at least 39 dBm-30 dB=9 dBm.

2) According to the formula $EIRP_{N+m} \geq P_{aj-N+m} + TH_{N+m}$, where $P_{aj-N+m} = EIRP_N - L_{N+m}$. $EIRP_N$ in this example is 39 dBm. $L_{N+m} = 42$ dB, $TH_{N+m} = 16$ dB, then $P_{aj-N+m} = -3$ dBm; $EIRP_{N+m} \geq -3$ dBm+16 dB=13 dBm, so $EIRP_{N+m}$'s lower limit is at least 13 dBm.

3) According to the above steps 1) and 2), confirm that the EIRP of the compensation device of CH24 should not be lower than 13 dBm.

4) According to the formula $EIRP_{N+m} \leq EIRP_N - R_{D/U-N}$, where in this embodiment, $R_{D/U-N}$ is $-30$ dB, $EIRP_N = 39$ dBm, so $EIRP_{N+m}$'s upper limit of is at most 39 dBm-(-30 dB)=69 dBm.

5) According to the formula $EIRP_{N+m} \leq EIRP_N + L_{N+m-1} - TH_N$; in this embodiment, $EIRP_N = 39$ dBm. $L_{N+m-1} = 45$ dB, $TH_N = -5$ dB, from which the $EIRP_{N+m}$ upper limit is at most 39 dBm+45 dB-(-5 dB)=89 dBm.

6) According to the above steps 4) and 5), confirm that the EIRP of the CH24 compensation device cannot exceed 69 dBm at most.

Figure 5:
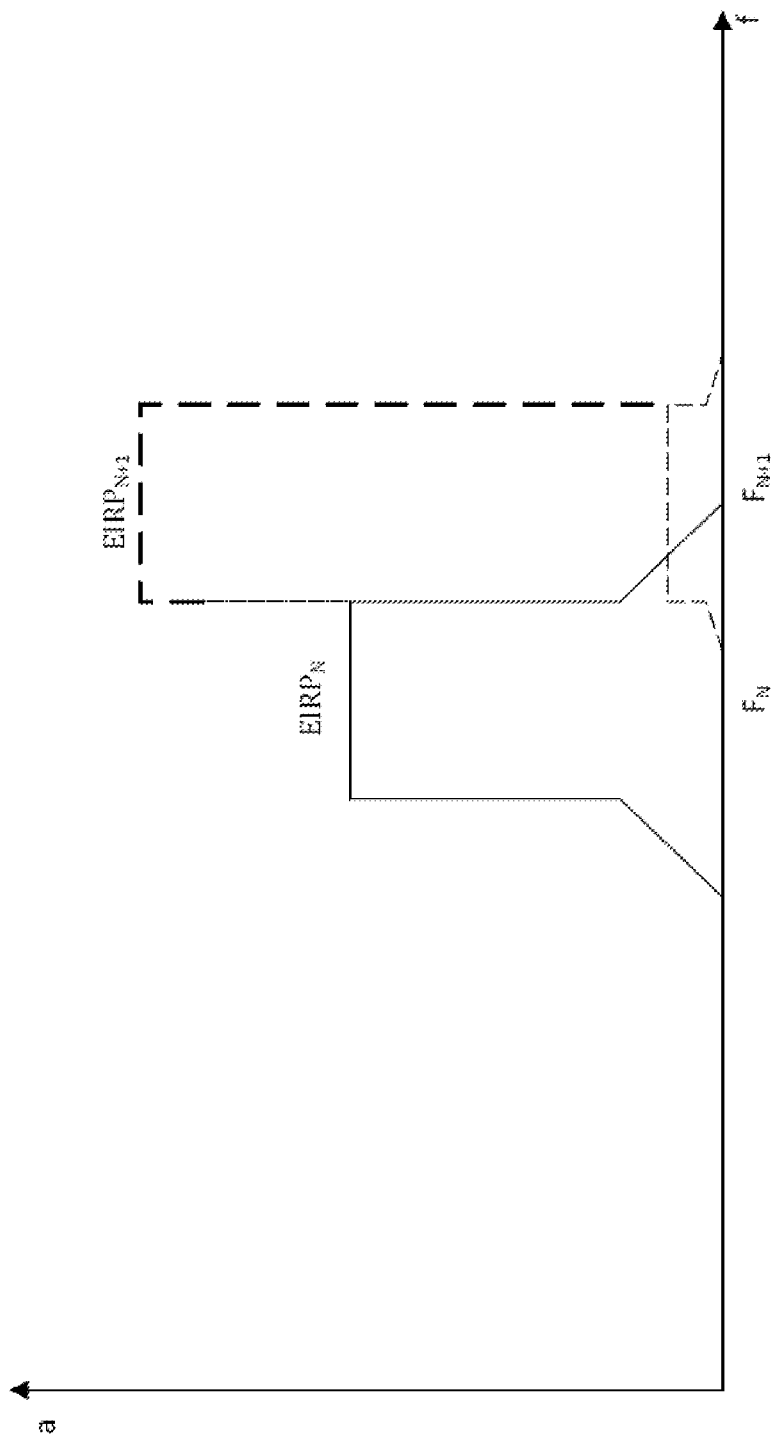
FIG. 5 is a schematic diagram of the spectrum of the white space device and its upper adjacent frequency authorized signal both before and after the enhancement in Embodiment 2.

7) According to the above steps 1) to 6), the range reference of the transmit power can be obtained. In practical applications, it should be flexibly adjusted according to the needs, and a sufficient margin should be ensured. Finally, in this embodiment, the equivalent omnidirectional transmit power of the CH24 compensation device is selected to be 60 dBm. FIG. 5 shows the schematic diagram of the spectrum before and after the installation of the white space device and its upper adjacent frequency compensation device.

8) The power compensation device of CH24 is added at the installation point of the super Wi-Fi base station. In this embodiment, it is considered that the address of the super Wi-Fi base station is at the edge of the coverage of the main tower of CH24, and the received signal is weak, so it can be considered to install the same frequency CH24 transmitter to be aligned with the main tower to form a single-frequency network. Therefore, within a certain coverage radius with the super Wi-Fi base station erection point, the signal of CH24 can be strengthened to guarantee the coverage of CH24 in this area.

Step 4. In the overlapping area of the intended coverage of the super Wi-Fi base station and the coverage of the upper adjacent frequency authorized signal, test the reception of the upper adjacent frequency authorized signal, and confirm that in the entire overlapping area, the coverage and reception of CH24 have no change before and after the installation of the super Wi-Fi base station. In this embodiment, before the super Wi-Fi base station is erected, CH24 can receive normally; after the super Wi-Fi base station is erected, the adjacent frequency impact on CH24 is: 39 dBM−42=−3 dBm, at this time, CH24 is equipped with compensation device (another transmitter to form a single frequency network), the output power is 60 dBm, so its signal-to-noise ratio is approximately equal to 60 dBm−(−3 dBm)=63 dB, which exceeds its receiving threshold (16 dB). Therefore, it is determined that the transmit power set by the upper adjacent frequency transmitter is sufficient to compensate for the deteriorating influence of the super Wi-Fi base station on its adjacent frequency.

Step 5. In the intended coverage area of the super Wi-Fi base station, do the reception test to confirm whether the coverage requirements are met. In this embodiment, the adjacent frequency influence of CH24 on CH23 is measured as 60 dBm−45 dB=15 dBm, compared with the transmit power of the super Wi-Fi base station of 39 dBm, its signal-to-noise ratio is about 24 dB, which exceeds the noise ratio threshold of the super Wi-Fi base station which is −5 dB; therefore, it is determined that the transmit power set by the upper adjacent frequency transmitter will not affect the coverage and reception of the super Wi-Fi base station.

Embodiment 3

Figure 6:
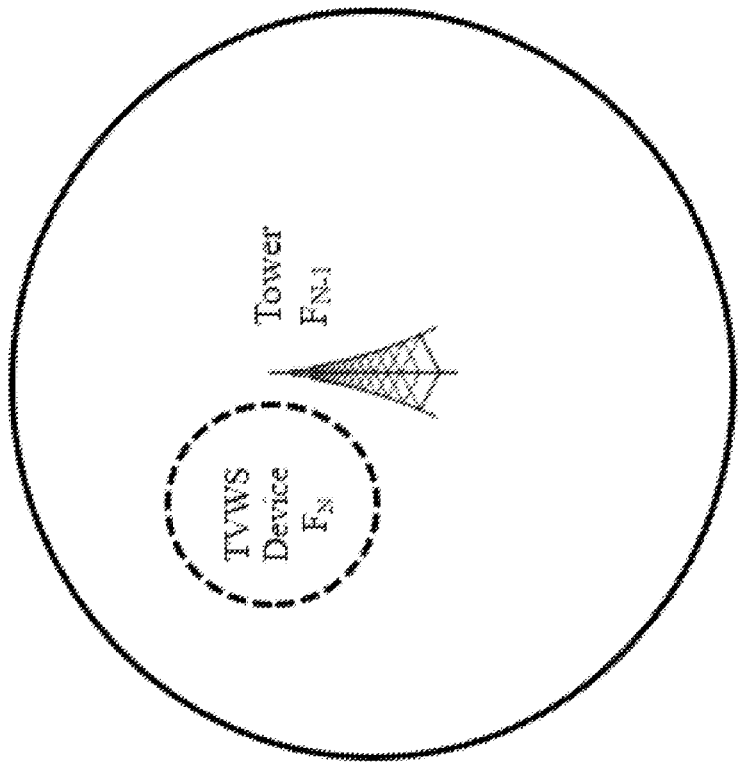
FIG. 6 is the schematic diagram that the intended coverage of the white space device in Embodiment 3 only overlaps with the authorized coverage of its lower adjacent frequency authorized signal.
Figure 6:
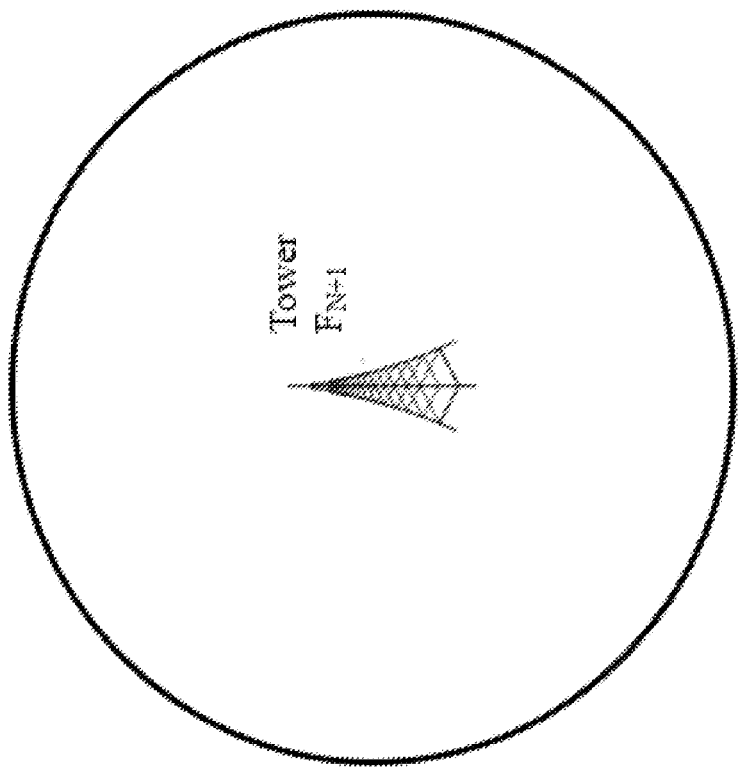

The application environment of the white space optimization method based on the enhancement of the adjacent frequency involved in this embodiment is shown in FIG. 6.

This embodiment specifically includes the following steps:

Step 1. According to the application, it is necessary to realize the signal coverage of the white space device within the range of the dotted circle area shown in FIG. 6. In this embodiment, the white space device is LTE user equipment (UE), the radius of the dotted circle area is 200 meters, the LTE user equipment installation point is at the center of the circle, and the proposed EIRP=0.2 w (that is, 23 dBm), the height of the antenna to be erected is 10 meters.

Step 2. According to the above LTE user equipment installation information, in the known spectrum utilization database, find the white space frequency that can be used locally, for example, CH31, and the corresponding maximum power can be 40 dBm according to local regulations, then the intended transmit power can be maintained as 23 dBm. At the construction site of LTE user equipment, measure the noise floor superimposed on CH31 due to adjacent frequency signal transmission, and record the noise floor as −80 dBm. It is known that the intended transmit power of the LTE user equipment is 23 dBm, the engineering design receiving margin is 20 dB, and the receiving threshold is −3 dB, then 23 dBm−(−80 dBm)=103 dB>−3 dB+20 dB, determine the intended coverage of the LTE user equipment's signal reception will not be affected by the noise floor of the adjacent frequency, thus confirming that the white space frequency CH31 is usable. Set up LTE user equipment there, and conduct trial transmission at 23 dBm within the intended coverage.

Step 3. From FIG. 6, it can be seen that the intended coverage of the LTE user equipment has overlaps with the authorized coverage of its lower adjacent frequency CH30 TV broadcast signal tower (shown in FIG. 6) but has no overlap with the authorized coverage of the upper adjacent frequency CH32 (also shown in FIG. 6), then in this embodiment, only the lower adjacent frequency CH30 needs to be reasonably strengthened, and the upper and lower thresholds of reasonable strengthening are as follows:

1) According to the formula $EIRP_{N-m} \geq EIRP_N + R_{D/U-N-m}$, where in this embodiment, $R_{D/U-N-m}$ is −35 dB, $EIRP_N$=23 dBm, so $EIRP_{N-m}$'s lower limit of is at least 23 dBm−35 dB=−12 dBm.

2) According to the formula $EIRP_{N-m} \geq P_{aj-N-m} + TH_{N-m}$, where $P_{aj-N-m} = EIRP_N - L_{N-m}$. EIRP in this example N=23 dBm, $L_{N-m}$=30 dB, $TH_{N-m}$=16 dB, then $P_{aj-N-m}$=−7 dBm; $EIRP_{N-m} \geq$−7 dBm+16 dB=9 dBm, so $EIRP_{N-m}$'s lower limit is at least 9 dBm.

3) According to the above steps 1) and 2), confirm that the EIRP of the compensation device of CH30 should not be lower than 9 dBm.

4) According to the formula $EIRP_{N-m} \leq EIRP_N - R_{D/U-N}$, where in this embodiment, $R_{D/U-N}$=−30 dB, $EIRP_N$=23 dBm, so $EIRP_{N-m}$'s upper limit is at most 23 dBm+30 dB=53 dBm.

5) According to the formula $EIRP_{N-m} \leq EIRP_N + L_{N-m+1} - TH_N$: in this embodiment, EIRP N=23 dBm, $L_{N-m+1}$=45 dB, $TH_N$=−3 dB, so $EIRP_{N-m}$'s upper limit is at most 23 dBm+45 dB−(−3 dB)=71 dBm.

6) According to the above steps 4) and 5), confirm that the EIRP of the CH30 compensation device cannot exceed 53 dBm.

7) According to the above steps 1) to 6), the range reference of the transmit power can be obtained. In practical applications, it should be flexibly adjusted according to the needs, and a sufficient margin should be ensured. Finally, in this embodiment, the EIRP of the CH30 compensation device is selected to be 33 dBm, as shown in FIG. 7.

8) A power compensation device of CH30 is added at the installation place of the LTE user equipment. In this embodiment, the LTE user equipment location is considered to be close to the CH30 main tower and is located in one of the dense center coverage areas. Therefore, it can be considered to do the enhancement in the form of an optical fiber repeater, which is to receive the RF signal from the CH30 main tower through the optical fiber and then amplify the power through the repeater. Then, transmit with the same frequency transmitting antenna of CH30, and set EIRP to be 33 dBm to realize the power compensation of CH30 in this area. The advantage of using optical fibers in this embodiment is to avoid interference from many obstacles in a dense area.

Step 4. In the overlapping area of the intended coverage area of the LTE user equipment and the coverage area of the lower adjacent frequency authorized signal, test the reception of the lower adjacent frequency authorized signal, and confirm that in the entire overlapping area, the coverage and reception of the CH30 do not change before and after the LTE user equipment is installed. In this embodiment, before the LTE user equipment is erected, the CH30 can receive normally; after the LTE user equipment is erected, the adjacent frequency influence on the CH30 is: 23 dBm−30=−7 dBm, and a compensation device (optical fiber repeater) is added to the CH30 at this time and its output power is 33 dBm, so its signal-to-noise ratio is approximately equal to 33 dBm−(−7 dBm)=40 dB, which exceeds its receiving threshold (16 dB). Therefore, it is determined that the transmit power set by the lower adjacent frequency repeater is sufficient to compensate for the deteriorating influence of the LTE user equipment on the adjacent frequency.

Step 5. In the intended coverage area of the LTE user equipment, do reception tests to confirm whether the coverage requirements are met. In this embodiment, the adjacent frequency impact of CH30 on CH31 is measured as 33 dBm−45 dB=−12 dBm, compared with the transmit power of LTE user equipment of 23 dBm, its signal-to-noise ratio is about 35 dB, which exceeds the signal-to-noise ratio of LTE user equipment threshold (−3 dB); therefore, it is determined that the transmit power set by the lower adjacent frequency repeater will not affect the coverage and reception effect of the LTE user equipment.

The above-mentioned specific implementation can be partially adjusted by those skilled in the art in different ways without departing from the principle and purpose of the present invention. The protection scope of the present invention is subject to the claims and is not limited by the above-mentioned specific implementation. Each implementation within the scope is bound by the present invention.

What is claimed is:

1. A method of optimizing the utilization of white space based on the enhancement of the adjacent frequency, characterized in that, by obtaining an available white space frequency and compensating the upper and/or lower adjacent frequencies respectively according to the relationship between the coverage of its adjacent frequency authorized signals and the coverage of the white space device, so that the white space device can obtain the maximum number of selectable channels and the maximum transmission power without affecting the existing adjacent frequency authorized signals;

the said relationship refers to: whether there is an overlap between the preset transmission coverage of the white space device and the authorized coverage of adjacent frequency signals;

the said enhancement of the adjacent frequency is to use the adjacent frequency compensation device to increase the transmission intensity of the authorized signal of the upper and/or lower adjacent frequency, compensate for the interference generated by the white space device, and to optimize the reception margin of the original upper and lower adjacent frequency transmission signals.

2. The method of optimizing the utilization of white space based on the enhancement of the adjacent frequency according to claim 1, wherein the said acquiring the available white space frequency is achieved by querying a local spectrum utilization database according to the transmitting point information of the white space device, specifically including:

i) when there is a corresponding e EIRP threshold for each available white space frequency in the list, select any frequency whose EIRP threshold is greater than the intended transmit power, or if all frequencies' thresholds are smaller than the intended transmitting power, choose one which has the closest threshold as the intended transmit power, when none of the available white space frequencies in the list has a predefined EIRP threshold, choose any white space frequency ($F_N$) and use the intended transmit power as its threshold ($EIRP_N$), N corresponds to the channel number of the frequency of the white space;

ii) before the white space device transmits the signal at $F_N$, first measure the noise floor within the entire channel bandwidth of channel number N (unit: dBm); if the difference between the noise floor $Noise_N$ and $EIRP_N$ is greater than or equal to the white space device reception threshold $TH_N$ plus the receiving margin $M_N$, then determine the current white space frequency $F_N$ is usable, otherwise repeat steps 2.1 and 2.2 and re-select another available white space frequency; and iii) the white space device then uses the frequency $F_N$ at the predetermined emission point and transmits the signal with the corresponding $EIRP_N$ to the intended coverage area for a test launch.

3. The method of optimizing the utilization of white space based on the enhancement of the adjacent frequency according to claim 1, wherein the overlap refers to: the transmitting point of the white space device, detecting its adjacent frequency $F_{N+m}$ and $F_{N-m}$ to see whether there is an authorized signal in the same area, and compare the authorized coverage of the authorized signals on the adjacent frequency and the trial transmission coverage of the white space device.

4. The method of optimizing the utilization of white space based on the enhancement of the adjacent frequency according to claim 3, is characterized in that, when there is no overlap between the trial transmission coverage of the white space device and the authorized coverage of the adjacent frequency signal, it is not necessary to enhance any adjacent frequency authorized signal; when the trial transmission coverage of the device and the authorized coverage of the upper adjacent frequency and/or the lower adjacent frequency authorized signal overlap, the adjacent frequency compensation device is used to reasonably enhance the upper and/or lower adjacent frequency authorized signal.

5. The method of optimizing the utilization of white space based on the enhancement of the adjacent frequency according to claim 1, wherein the said enhanced $EIRP_{N+m}$ of the upper frequencies and $EIRP_{N-m}$ of the lower adjacent frequencies satisfy: the higher number of the Condition A and Condition B as $EIRP_{N+m}$ and $EIRP_{N-m}$'s lower limit, and the lower number of the Condition C and Condition D as the $EIRP_{N+m}$ and $EIRP_{N-m}$'s upper limit, in which:

Condition A) $EIRP_{N+m} - EIRP_N \geq R_{D/U-N+m}$; $EIRP_{N-m} - EIRP_N \geq R_{D/U-N-m}$, which is $EIRP_{N+m} \geq EIRP_N + R_{D/U-N+m}$, $EIRP_{N-m} \geq EIRP_N + R_{D/U-N-m}$, where $EIRP_N$ is the equivalent isotropic transmit power of the white space device at frequency $F_N$, $R_{D/U-N+m}$ and $R_{D/U-N-m}$ is the threshold of the desired-to-undesired signal ratio that the receiver can resist against noise as defined in the corresponding standard of the adjacent channel authorized signal;

condition B) $EIRP_{N+m}-P_{aj-N+m} \geq TH_{N+m}$ and $EIRP_{N-m}-P_{aj-N-m} \geq TH_{N-m}$, which is $EIRP_{N+m} \geq P_{aj-N+m}+TH_{N+m}$ and $EIRP_{N-m} \geq P_{aj-N-m}+TH_{N-m}$, where: $P_{aj-N+m}$ and $P_{aj-N-m}$ is the power leaked to its upper and lower adjacent frequencies by the white space device, respectively, and $P_{aj-N+m}=EIRP_N-L_{N+m}$; $P_{aj-N-m}=EIRP_N-L_{N-m}$, where: $EIRP_N$ is the equivalent isotropic transmit power of the white space device at frequency $F_N$, $L_{N+m}$ and $L_{N-m}$ is the reduction value of the leakage power of the upper and lower adjacent frequencies of the white space device compared to its transmit power at the white space frequency; $TH_{N+m}$, $TH_{N-m}$ are the received signal-to-noise ratio thresholds of the upper and lower adjacent frequency authorized signals respectively;

Condition C) $EIRP_N-EIRP_{N+m} \geq R_{D/U-N}$ and $EIRP_N-EIRP_{N-m} \geq R_{D/U-N}$, which is $EIRP_{N+m} \leq EIRP_N-R_{D/U-N}$, $EIRP_{N-m} \leq EIRP_N-R_{D/U-N}$, where: $EIRP_N$ is the equivalent isotropic transmit power of the white space device at frequency $F_N$, $R_{D/U-N}$ is the lower limit of the desired-to-undesired signal ratio that the receiver can resist against noise as defined in the corresponding standard of the white space device; and condition D) $EIRP_{N+m} \leq EIRP_N+L_{N+m-1}-TH_N$; $EIRP_{N-m} \leq EIRP_N+L_{N-m+1}-TH_N$; where: $EIRP_N$ is the equivalent isotropic transmit power of the white space device at frequency $F_N$, $L_{N+m-1}$ and $L_{N-m+1}$ is the ratio of the main signal power of the adjacent frequency to their adjacent upper/lower adjacent channels, that is, the interference power difference of the white space frequency; $TH_N$ is the receiving signal-to-noise ratio threshold of the white space device.

6. The method of optimizing the utilization of white space based on the enhancement of the adjacent frequency according to claim 1, characterized in that, the setting method used for the enhancement is: local manual setting or remote setting, real-time update on demand or preset fixed value, independent control of each emission point or included in the unified planning of the white space device, and linked with the transmit power of the white space device, and coordinated by the central control system.

7. The method of optimizing the utilization of white space based on the enhancement of the adjacent frequency according to claim 1, wherein the adjacent frequency power compensation device is implemented in either of the following ways:

i) setting up an on channel repeater for the upper and lower adjacent frequencies respectively, comprising: set up the receiving and transmitting antennas respectively at $F_{N+m}$ and $F_{N-m}$; each to receive $F_{N+m}$ and $F_{N-m}$ from the nearby authorized on-air signal and reasonably amplify the signal respectively, and then send it out through the transmitting antenna with the same frequency as the receiving antenna, so as to achieve the supplementary coverage of adjacent frequency in the area via on channel repeaters;

ii) using an optical fiber repeater, getting the signal directly from the nearby authorized signal source via optical fiber and send it to the installation point, where the optical fiber repeater amplifies the signal and send it out through the same frequency transmitting antenna, so as to achieve the supplementary coverage of adjacent frequency in the area via optical fiber repeater; and iii) setting up a transmitter at the installation point, to receive authorized off-air signal, and set up the transmitting frequency as the same frequency as the original adjacent frequency authorized signal and by building a single frequency network to realize the supplementary point transmitter.

8. The method of optimizing the utilization of white space based on the enhancement of the adjacent frequency according to claim 1, wherein detect the intensity of the adjacent frequency authorized signal in the overlapping area of the intended coverage area of the white space device and the adjacent frequency authorized signal coverage area; when the adjacent frequency authorized signal is affected by the activation of the white space device, check the setting and installation of the upper and/or lower adjacent frequency compensation device and further increase the EIRP of the adjacent frequency compensation device.

9. The method of optimizing the utilization of white space based on the enhancement of the adjacent frequency according to claim 1, characterized that, within the intended coverage area of the white space device, testing the reception of the white space device, and verifying whether the coverage requirements are met: if the proposed EIRP has been transmitted, but the proposed coverage still cannot be met, then check the installation and setting of the white space device and further reduce the EIRP of the adjacent frequency compensation device and re-test it in the overlapping area.

* * * * *